US00H002285H

(19) United States
(12) Statutory Invention Registration
Trzcinski et al.

(10) Reg. No.: US H2285 H
(43) Published: Sep. 3, 2013

(54) AUTOMATIC AIRFOIL ROOT PREP MACHINE AND ASSOCIATED METHOD

(75) Inventors: Frank J. Trzcinski, Ellington, CT (US); Manfried Carl Verch, Jr., Wallingford, CT (US)

(73) Assignee: United Technologies Corporation, Hartford, CT (US)

(21) Appl. No.: 13/013,188

(22) Filed: Jan. 25, 2011

(51) Int. Cl.
*B24B 51/00* (2006.01)

(52) U.S. Cl. ..... 451/5
(58) Field of Classification Search ..... 451/5
See application file for complete search history.

(56) References Cited

U.S. PATENT DOCUMENTS

| | | | |
|---|---|---|---|
| 3,561,032 | A | 2/1971 | Kasnyik et al. |
| 4,914,872 | A | 4/1990 | Snyder et al. |
| 6,171,175 | B1 | 1/2001 | Shaikh et al. |
| 6,439,961 | B1 | 8/2002 | Hammond et al. |
| 2012/0190272 | A1 * | 7/2012 | Trzcinski et al. ..... 451/5 |

* cited by examiner

*Primary Examiner*—Daniel Pihulic
(74) *Attorney, Agent, or Firm*—Kinney & Lange, P.A.

(57) ABSTRACT

An apparatus for polishing an airfoil root includes a fixture for holding the airfoil, an actuation cylinder assembly for moving the fixture holding the airfoil, a brush, a motor for rotating the brush, a switch, and control circuitry. The actuation cylinder assembly is configured to move the fixture holding the airfoil toward the brush to trigger the switch, and the control circuitry is configured to run a timer when the switch is triggered to control contact between the airfoil and the brush for polishing.

16 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AUTOMATIC AIRFOIL ROOT PREP MACHINE AND ASSOCIATED METHOD

BACKGROUND

The present invention relates to an apparatus and method for preparing airfoil roots through polishing or cleaning.

In many situations it is desirable to polish or otherwise clean or prepare a workpiece. For example, in some applications, portions of airfoils for gas turbine engines are desired to be polished to remove oxidation to allow for electrical contact for a plating operation. In such situations, it is desired to remove oxidation to provide electrical contact at a bottom of a root of the airfoil. The plating operation can then be performed, such as for a Turbo Tip™ application where material is plated onto a tip of the airfoil to facilitate cut-in seal formation at the airfoil tip when installed in a gas turbine engine.

In the prior art, polishing operations were performed manually with an operator manually holding a blade root in contact with a rotating polishing brush. This manual process presents a number of ergonomic and safety concerns because the operator must perform repetitive tasks and place his or her hands near the rotating brush. Moreover, manual polishing can result in undesirable variation between polishing operations due to operator actions that are not identical for all polishing operations.

Thus, an improved method and apparatus for workpiece polishing or cleaning is desired.

SUMMARY

An apparatus for polishing an airfoil root according to the present invention includes a fixture for holding the airfoil, an actuation cylinder assembly for moving the fixture holding the airfoil, a brush, a motor for rotating the brush, a switch, and control circuitry. The actuation cylinder assembly is configured to move the fixture holding the airfoil toward the brush to trigger the switch, and the control circuitry is configured to run a timer when the switch is triggered to control contact between the airfoil and the brush for polishing. In another aspect, the present invention includes an associated polishing method.

DETAILED DESCRIPTION

Figure 1:
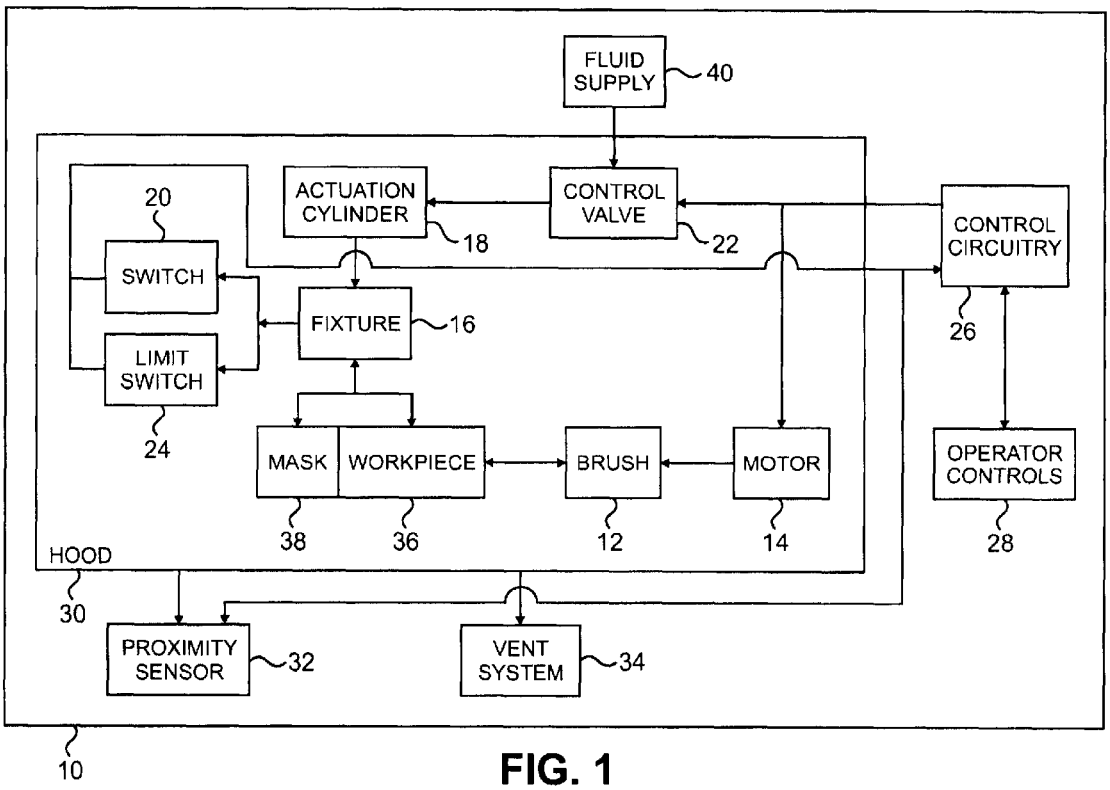
FIG. 1 is a block diagram of an airfoil polishing machine according to the present invention.
Figure 2:
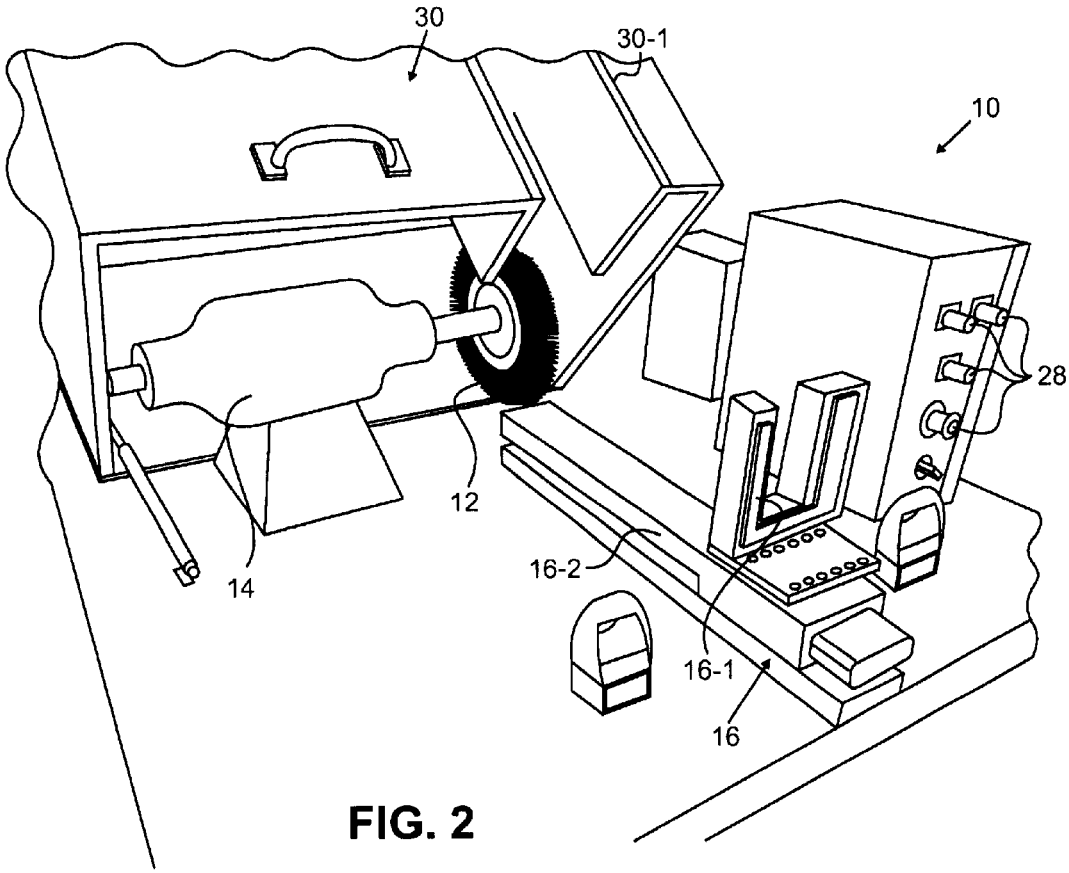
FIG. 2 is a perspective view of the machine of FIG. 1.

FIG. 1 is a block diagram of an airfoil polishing machine 10, and FIG. 2 is a perspective view of the machine 10. In the illustrated embodiment, the machine 10 includes a brush 12, a motor 14, a fixture 16, an actuation cylinder 18, a switch 20, a control valve 22, a limit switch 24, control circuitry 26, operator controls 28, a hood 30, a proximity sensor 32 and a vent system 34. A workpiece 36 and an optional workpiece mask 38 can be engaged with the machine 10 for polishing, buffing, abrasive cleaning or other preparation procedures. As used herein, the term "polishing" is intended to encompass all polishing, buffing, abrasive cleaning or other similar procedures.

The brush 12 can be an abrasive polishing brush, such as a 10 inch (25.4 cm) outer diameter aluminum oxide grit wheel brush, available from Weiler Corp., Cresco, Pa. The particular characteristics of the brush 12 can vary as desired for particular applications. Moreover, in alternative embodiments, a polishing, buffing or cleaning implement other than a brush could be used. The motor 14 is used to rotate the brush 12. In one embodiment, the motor is a 1 horsepower (746 watt) rotary buffer, available from Baldor Electric Co., Fort Smith, Ark.

The fixture 16 is used to movably hold the workpiece 36. In the illustrated embodiment, the fixture 16 includes a workpiece holder slot 16-1 that can accept and retain the workpiece 36 (along with the mask 38, if present) as well as a linear track 16-2 for guiding the workpiece along a linear path that extends toward the brush 12.

The actuation cylinder 18 can be a fluidically-actuated cylinder that produces substantially linear actuation, such as a pneumatic cylinder or a hydraulic cylinder. Fluid can be supplied from a fluid supply 40 through a suitable control valve 22 to pressurize the actuation cylinder 18 to induce movement. The fluid supply 40 can be incorporated within the machine 10, or can be an external supply such as a pneumatic shop air system connected to the control valve 22 and the actuation cylinder 18 through suitable conduits, hoses, pipes, etc. The fixture 16, specifically the holder 16-1, is engaged with the actuation cylinder 18 such that the actuation cylinder can move the fixture (carrying the workpiece 36) toward or away from the brush along the linear path.

The switch 20 is configured to sense when the fixture 16 has moved the workpiece 36 to a given point sufficient to bring the workpiece 36 into contact with the brush 12. When the switch 20 is triggered, a timer is activated by the control circuitry 26 to regulate the cleaning operation.

The limit switch 24 is configured to detect excessive movement of the holder 16-1 of the fixture 16 toward the brush 12 beyond a given point. The limit switch 24 is generally located closer to the brush 12 than the switch 20. Triggering (i.e., "faulting out") the switch 24 can indicate that the brush 12 is worn or otherwise in need of replacement, or that a workpiece 36 is not present in the fixture 16. Moreover, triggering the switch 24 can generate a suitable indication to an operator via the control circuitry 26 that action is needed.

The control circuitry 26 acts as the central control for most of the functions of the machine 10. The control circuitry 26 can include suitable circuits, processors, memory and other subcomponents as necessary or desired for particular applications. The operator controls 28 are provided to allow an operator to activate and control the machine 10. In one embodiment, the operator controls 28 include a pair of operator buttons, switches or other suitable controls for activating the machine 10 to perform a polishing operation, with the pair of operator controls configured as "dead man" switches such that all (i.e., both) must be triggered to activate the machine 10 to perform a polishing operation. In this way the operator controls 28 help ensure that an operator must place both hands at the controls 28 and away from the brush 12 during polishing, to promote operator safety. The operator controls can include other functionality, such as suitable indicators or displays as desired.

The hood 30 can cover portions of the machine 10 during operation for operator safety purposes and to help contain dust and debris. The hood 30 can be pivotal, to allow access inside when needed. When closed, the hood 30 can cover the brush 12, the motor 14, and at least portions of the fixture 16, the workpiece 36 and the mask 38. The hood 30 can include an opening 30-1 to allow the workpiece 36 to be inserted into the holder 16-1 of the fixture 16 with the hood 30 closed, and for the workpiece 36 and the fixture 16 to be moved toward the brush 12 during a polishing operation while the hood 30 remains closed. The proximity sensor 32 can be positioned adjacent to the hood 30 to detect when the hood 30 is open. An open hood condition can be indicated to the control circuitry 26, and can prevent a polishing operation from beginning, that is, operations of the motor 14 and the actuation cylinder 18 can be prevented and actuation of the operator control 28 overridden. The vent system 34 can be operably connected to the hood 30 to evacuate dust and debris.

The machine 10 can be used with a variety of types of workpieces 36. In one embodiment, the workpiece 36 is an airfoil for a gas turbine engine, and includes a root portion. The workpiece 36 can be made of a nickel-based superalloy or other materials. The machine 10 can be used to help remove oxidation from the workpiece, in particular to remove oxidation from a bottom portion of the root of an airfoil to allow for electrical contact at the root for a later plating operation.

In order to perform a polishing operation, an operator can first position the mask 38, if used, on the workpiece 36. The workpiece 36 and the mask 38 are then placed in the holder 16-1 of the fixture 16 (with the root facing toward the brush 12 if the workpiece 36 is an airfoil), which is initially in a "home" position spaced from the brush 12 and accessible from outside the hood 30. The hood 30 is closed if it is open. The operator then triggers the operator controls 28 to initiate polishing—the operator should not be touching the workpiece 36 at this point. The control circuitry 26 responds to the operator input by rotating the brush 12 with the motor 14. The actuation cylinder 18 moves the fixture 16 and the workpiece 36 toward the rotating brush 12 along the linear path. The workpiece 36 (i.e., the root of the airfoil) comes into contact with the rotating brush 12, which can abrasively remove oxidation on the workpiece 36. The actuation cylinder 18 advances the fixture 16 holding the actuation cylinder 18 the workpiece 36 toward the brush 12 at given pressure within the actuation cylinder 18, such as approximately 14 psi (96.53 kPa). The pressure within the actuation cylinder 18 can correspond to a force of the brush 12 against the workpiece 36 of approximately 5-6 lbs (22.24-26.69 N) in some embodiments. When the actuation cylinder 18 moves the fixture 16 far enough the trigger the switch 20, a timer is initiated by the control circuitry 26. The control circuitry 26 governs operation of the actuation cylinder via the control valve 22, and maintains contact between the workpiece 36 and the brush 12 for a given time period established by the timer, such as 1-2 seconds in one embodiment. In this way, movement of the holder 16-1 and the workpiece 36 toward the brush 12 is not to any particular fixed spatial location, but can correspond to a variety of spatial locations of the holder 16-1 and the workpiece 36 relative to the brush 12. The actuation cylinder 18 will continue to advance the fixture 16 as long as pressure is supplied to do so, with the corresponding travel distance of the workpiece 36 able to vary depending upon factors such as the amount of wear of the brush 12. The limit switch 24 detects excessive movement of the fixture 16 which can indicate that the brush 12 is worn and in need of replacement. After the given time period, during which polishing is accomplished due to abrasive contact between the brush 12 and the workpiece 36, the control circuitry 26 caused the actuation cylinder 18 to move the fixture 16 and the workpiece 36 away from the brush 12 and back to the home position. The operator can then remove the polished workpiece 36, and can optionally insert a new workpiece to begin another polishing operation. The control circuitry 26 can let the motor 14 continue to run and rotate the brush 12 after the fixture 16 has returned to the home position for a period of time, such as two minutes, to reduce on/off cycling of the motor 14 between successive polishing operations. Operation of the motor 14 can be stopped during such a time period if the proximity sensor 32 detects that the hood 30 has been opened.

Those of ordinary skill in the art will recognize that the present invention provides numerous advantages and benefits. For example, reliable and repeatable polishing can be provided despite brush wear over time that can reduce the diameter of the brush or variations in individual workpieces. Moreover, the need for complex brush actuation equipment with complex positioning and sensors is reduced, which results in greatly reduced capital costs for the polishing equipment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus for polishing an airfoil root, the apparatus comprising:

a fixture for holding the airfoil;

an actuation cylinder assembly for moving the fixture holding the airfoil;

a brush;

a motor for rotating the brush;

a switch, wherein the actuation cylinder assembly is configured to move the fixture holding the airfoil toward the brush to trigger the switch; and control circuitry, wherein the control circuitry is configured to run a timer when the switch is triggered to control contact between the airfoil and the brush for polishing.

2. The apparatus of claim 1, wherein the actuation cylinder assembly comprises a linear pneumatic cylinder.

3. The apparatus of claim 1 and further comprising:

a limit switch configured to detect excessive travel of the fixture indicative of brush wear or the absence of the airfoil in the fixture.

4. The apparatus of claim 1 and further comprising:

a hood for shielding at least the brush during operation.

5. The apparatus of claim 4 and further comprising:

a proximity sensor for detecting whether the hood is open.

6. The apparatus of claim 1 and further comprising:

a pair of operator controls for activating the apparatus to perform a polishing operation, wherein the pair of operator controls are configured such that all must be triggered to activate the apparatus to perform a polishing operation.

7. The apparatus of claim 1, wherein the actuation cylinder is pressurized at approximately 96.53 kPa (14 psi) to advance the fixture.

8. The apparatus of claim 1, wherein timer is configured to run to a time period of approximately 1-2 seconds before the actuation cylinder moves the fixture away from the brush, wherein the actuation cylinder continues to advance the fixture toward the brush during the time period of the timer.

9. The apparatus of claim 1 and further comprising:

a vent system for venting airborne material present during operation of the apparatus.

10. The apparatus of claim 1 and further comprising:

a mask for masking a portion of the airfoil during polishing.

11. A method of polishing a workpiece, the method comprising:

positioning the workpiece in a fixture, wherein the fixture is movable;

rotating a brush;

moving the fixture toward the rotating brush at a given pressure in the actuation cylinder so that the workpiece can contact the brush;

triggering timer when a position of the fixture reaches a given point relative to the rotating brush; and moving the fixture away from the rotating brush with the actuation cylinder after a time period of the timer has elapsed.

12. The method of claim 11, wherein time period of the timer is approximately 1-2 seconds.

13. The method of claim 11, wherein operation of the actuation cylinder continues to advance the fixture toward the brush during the time period of the timer.

14. The method of claim 13, wherein a pressure in the actuation cylinder to move the fixture toward the rotating brush is approximately 96.53 kPa (14 psi).

15. The method of claim 11, wherein the brush is rotated for at least 2 minutes when activated to reduce motor cycling between polishing operations.

16. The method of claim 11 and further comprising:

detecting a movement limit of the fixture relative to the rotating brush, to detect excessive movement of the fixture.

* * * * *